United States Patent
Maehata et al.

(10) Patent No.: US 6,365,857 B1
(45) Date of Patent: Apr. 2, 2002

(54) PLASTICS SORTING APPARATUS

(75) Inventors: Hidehiko Maehata; Tetsuya Inoue; Hiroyuki Daiku; Daisuke Tamakoshi, all of Osaka (JP)

(73) Assignee: Hitachi Zosen Corporation (JP)

( * ) Notice: Subject to any disclaimer, the term of this patent is extended or adjusted under 35 U.S.C. 154(b) by 0 days.

(21) Appl. No.: 09/582,562
(22) PCT Filed: Nov. 1, 1999
(86) PCT No.: PCT/JP99/06089
 § 371 Date: Jul. 31, 2000
 § 102(e) Date: Jul. 31, 2000
(87) PCT Pub. No.: WO00/27536
 PCT Pub. Date: May 18, 2000

(30) Foreign Application Priority Data

Nov. 5, 1998 (JP) ............................................ 10/313832

(51) Int. Cl.$^7$ ................................................. B03C 7/00
(52) U.S. Cl. ................. 209/127.3; 209/127.1; 209/129
(58) Field of Search ........................ 209/127.3, 127.1, 209/128, 129, 130

(56) References Cited

U.S. PATENT DOCUMENTS 6,271,492 B1 * 8/2001 Maehata et al. ......... 209/127.1

FOREIGN PATENT DOCUMENTS

| JP | 09094482 A | 4/1994 |
|---|---|---|
| JP | 09299829 A | 11/1997 |
| JP | 09299830 A | 11/1997 |
| JP | 07178351 A | 7/1998 |

\* cited by examiner

*Primary Examiner*—Donald P. Walsh
*Assistant Examiner*—Joseph C Rodriguez
(74) *Attorney, Agent, or Firm*—Mark Kusner

(57) ABSTRACT

A conveyor (3) feeds batches of plastic chips (2) in feeding amounts W1 to a charging device (4). After the plastic chips (2) have been stirred and charged inside the charging device (4) for a certain period of time T, they are ejected in batches and fed continuously by a screw feeder (20) to a drum electrode (5) at a feeding amount per unit time W2. The feeding amount per unit time W2 is adjusted so as to satisfy W1/T≦W2≦v×B×H×D where v is the rotation speed of the drum electrode (5), B is a width of the drum electrode (5), H is an average thickness of the plastic chips (2) that have been fed onto the drum electrode (5), and D is a bulk density of the plastic chips (2).

4 Claims, 5 Drawing Sheets

PLASTICS SORTING APPARATUS

TECHNICAL FIELD

The present invention relates to a plastics sorting apparatus for sorting plastic chips obtained by fragmenting disposed plastic articles.

BACKGROUND ART

In recent years, the commitment to recycling garbage has been growing fast. The most common types of plastic that are consumed as raw material for plastic articles are vinyl chloride resin, polyethylene resin, polypropylene resin and polystyrene resin, and it seems that they account for major part of disposed plastics that are collected. To recycle such plastics, it is necessary to separate them by type.

Conventionally, a plastics sorting apparatus 50 as shown in FIG. 5 is used to sort plastic chips containing a plurality of different types of plastics as mentioned above. This plastics sorting apparatus 50 includes a charging device 52 and an electrostatic sorting apparatus 55. The charging device 52 charges batches of a predetermined amount of fragmented chips of different types of plastic while stirring them. The charged plastic chips 51 are then sorted by passing between a metal drum electrode 53 and an electrode plate 54.

The main section 56 of the charging device 52 is provided with an insertion portion 57 and an ejection portion 58. Inside the main section 56, a stirring member 59 is provided for stirring the plastic chips 51 that have been inserted into the main section 56 through the insertion portion 57. Above the insertion portion 57, a belt conveyer 60 is arranged so as to supply chips of fragmented plastic 51. The charging device 52 performs batch processing, which means that after the predetermined amount of plastic chips 51 has been stirred for a certain time, a batch of charged plastic chips 51 is ejected from the ejection portion 58 onto the metal drum electrode 53.

The metal drum electrode 53 is freely rotatable. Moreover, the electrode plate 54 is fastened in opposition to the metal drum electrode 53. An anode of a high-voltage power source 61 is connected to the metal drum electrode 53, and a cathode of the high-voltage power source 61 is connected to the electrode plate 54. This builds up an electrostatic field for sorting between the metal drum electrode 53 and the electrode plate 54. A first collecting container 62 and a second collecting container 63 are arranged below the metal drum electrode 53.

The following is an explanation of how this configuration operates.

A batch of a predetermined amount of fragmented plastic chips 51 is dropped from the belt conveyor 60 into the main section 56 of the charging device 52. Inside the main section 56, the different types of plastic chips 51 are stirred for a certain period of time and are charged by being rubbed against one another. The charged plastic chips 51 are then ejected in batches from the ejection portion 58 of the charging device 52 onto the peripheral surface of the rotating metal drum electrode 53. Those plastic chips 51 that have been charged positively are repelled by the metal drum electrode 53 and attracted by the electrode plate 54, and fall into the first collecting container 62. Those plastic chips 51 that have been charged negatively are attracted by the surface of the metal drum electrode 53, and fall into the second collecting container 63, due to the rotation of the metal drum electrode 53.

While the plastic chips 51 are being stirred in the main section 56 of the charging device 52, no new plastic chips 51 are fed by the belt conveyor 60. After the plastic chips 51 have been stirred for a certain time and all plastic chips 51 have been ejected from the ejection portion 58 of the charging device 52, the next plastic chips 51 are fed from the belt conveyor 60 to the charging device 52.

However, in this conventional apparatus, the charging device 52 performs batch processing, which means that after a predetermined amount of plastic chips 51 has been stirred for a certain time, a batch of charged plastic chips 51 is ejected. Therefore, a large amount of plastic chips 51 is ejected from the charging device 52 onto the peripheral surface of the metal drum electrode 53 each time, and there is a danger that the plastic chips 51 accumulate on the peripheral surface of the metal drum electrode 53 to form a layer that is thicker than is appropriate for electro static sorting. This poses a problem that the plastic chips 51 between the metal drum electrode 53 and the electrode plate 54 cannot be accurately sorted anymore.

It is therefore an object of the present invention to provide a plastics sorting apparatus capable of adjusting the feeding amount of plastic chips during the feeding of charged plastic chips onto a movable electrode so as to optimize the electrostatic sorting.

DISCLOSURE OF THE INVENTION

A plastics sorting apparatus in accordance with the present invention includes:

a charging device for charging a batch of a certain amount of different types of fragmented plastic chips while stirring the plastic chips, and an electrostatic sorting device for sorting plastic chips that have been charged with the charging device by passing them between a pair of sorting electrodes, characterized in that:

the charging device ejects a batch of plastic chips after stirring the plastic chips for a certain period of time T that is necessary to charge the plastic chips;

one of the pair of sorting electrodes is a stationary electrode, and the other of the pair of sorting electrodes is a movable electrode that is arranged to oppose the stationary electrode and adapted to rotate at a peripheral speed v;

the apparatus further comprises a first feeding device for feeding batches of a feeding amount W1 of the plastic chips to the charging device; and a second feeding device for continuously feeding onto the movable electrode of the electrostatic sorting device a feeding amount per unit time W2 of plastic chips that have been ejected in batches from the charging device; and the feeding amount per unit time W2 can be adjusted so as to satisfy $$W1/T \leq W2 \leq v \times B \times H \times D$$

where B is a width of the movable electrode, H is an average thickness of the plastic chips that have been fed onto the movable electrode, and D is a bulk density of the plastic chips.

With this configuration, the first feeding device feeds batches of different types of fragmented plastic chips in feeding amounts W1 to the charging device, and the charging device stirs and charges the plastic chips for a certain period of time T. Then, the plastic chips are ejected in batches from the charging device, fed at a feeding amount per unit time W2 by a second feeding device onto the movable electrode of the electrostatic sorting device, and pass between the rotating movable electrode and the stationary electrode. By this, the plastic chips are separated into positively charged plastic chips and negatively charged plastic chips.

In this process for sorting the plastic chips, by satisfying W1/T≦W2, after all the batch of plastic chips that have been ejected from the charging device are fed by the second feeding device to the movable electrode, the next (successive) batch of plastic chips is ejected from the charging device and fed by the second feeding device to the movable electrode. Thus, it can be avoided that, while first plastic chips that have been ejected from the charging device are being fed to the movable electrode with the second feeding device, successive plastic chips that are ejected later are added to the first plastic chips that are still in the second feeding device. Consequently, such a problem can be avoided that plastic chips pile up between the charging device and the second feeding device.

Moreover, by satisfying W2≦v×B×H×D, the feeding amount of plastic chips can be set optimally for electrostatic sorting, and the plastic chips that have been fed to the movable electrode form a layer on the movable electrode that has a suitable thickness for electrostatic sorting. Thus, it can be prevented that the plastic chips accumulate and form a layer that is thicker than is appropriate for electrostatic sorting.

In accordance with the present invention, it is preferable that the charging device includes a rotatable stirring member for stirring the plastic chips, and a feeding amount detector for detecting a feeding amount of the plastic chips that have been fed in batches from the first feeding device, wherein the first feeding device is a conveyor and the second feeding device is a screw feeder, and wherein the plastics sorting apparatus further comprising a control unit for controlling driving devices for driving the conveyor, the stirring member, the screw feeder and the movable electrode depending on a feeding amount that is detected by the feeding amount detector.

With this configuration, a control device controls the driving devices such that W1/T≦W2≦×B×H×D is satisfied, when the feeding amount of the plastic chips that are fed in batches from the conveyor to the charging device increases or decreases.

In accordance with the present invention, it is preferable that the plastics sorting apparatus further includes a shutter for opening and closing an ejection portion of the charging device.

With this configuration, the ejection portion is closed with the shutter, while the plastic chips are being stirred inside the charging device. Thus, insufficiently charged plastic chips are not ejected inadvertently through the ejection portion. Then, after the plastic chips have been stirred for a certain period of time T, the shutter opens the ejection portion, ejecting a batch of sufficiently charged plastic chips through the ejection portion.

BEST MODE FOR CARRYING OUT THE INVENTION

The following is a more detailed explanation of the present invention, with reference to the accompanying drawings (FIGS. 1 to 4).

Figure 1:
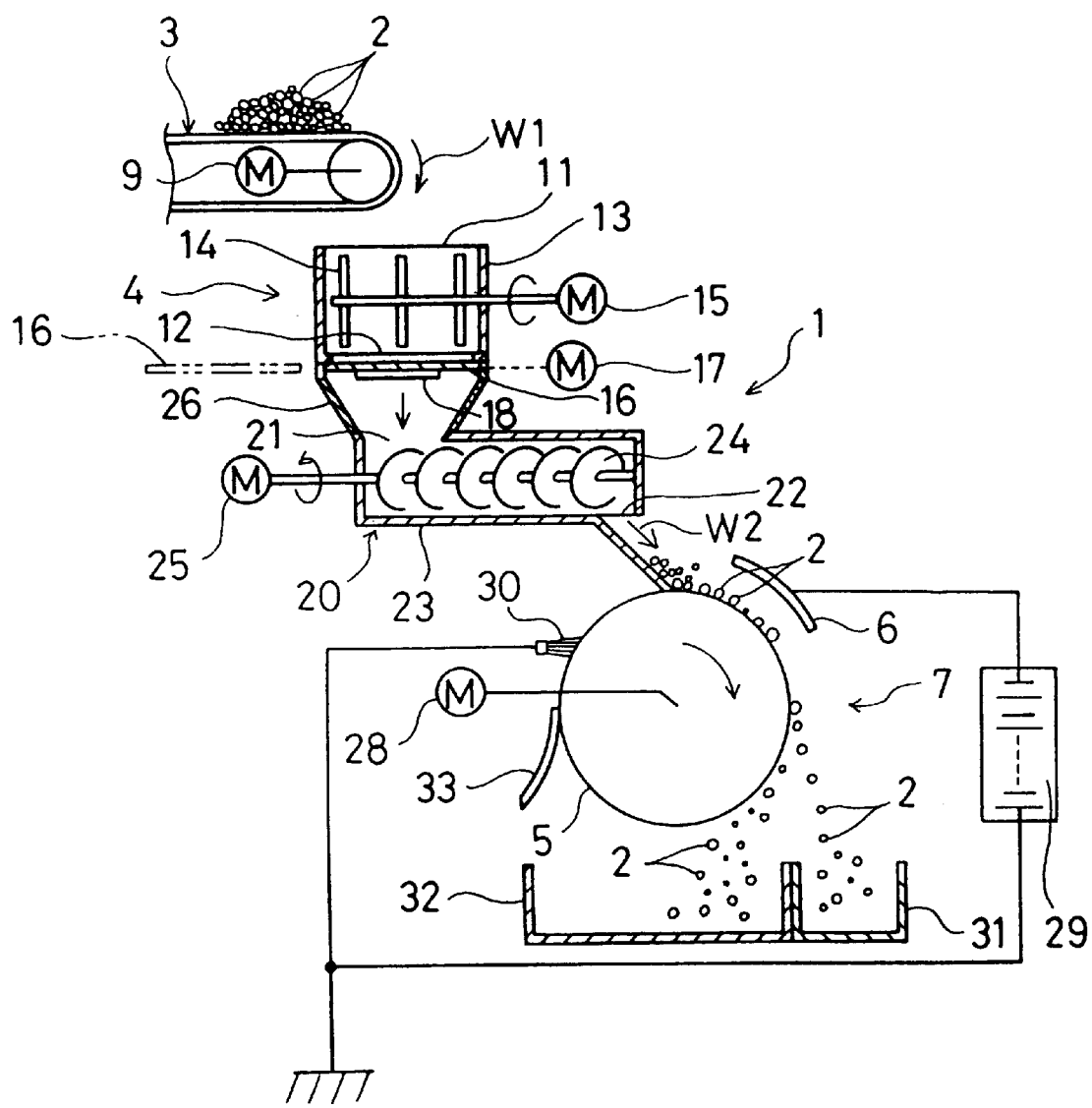
FIG. 1 is a diagram showing a configuration of a plastics sorting apparatus in a configuration in accordance with the present invention.
Figure 2:
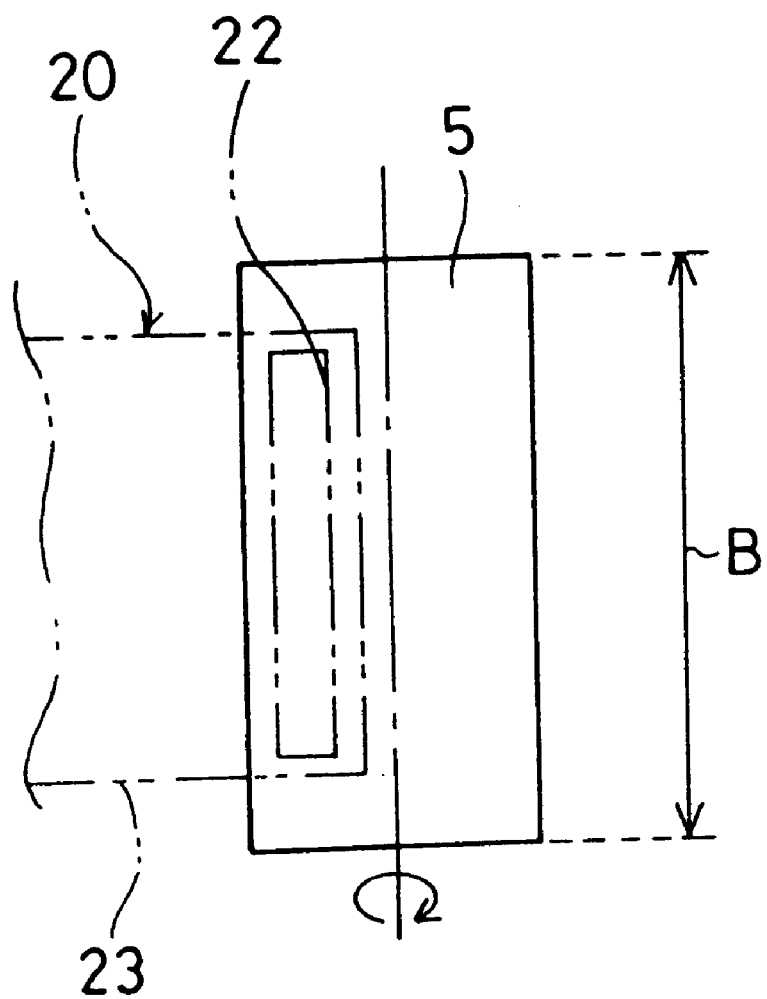
FIG. 2 is a schematic top view of a drum electrode of the plastics sorting apparatus.
Figure 3:
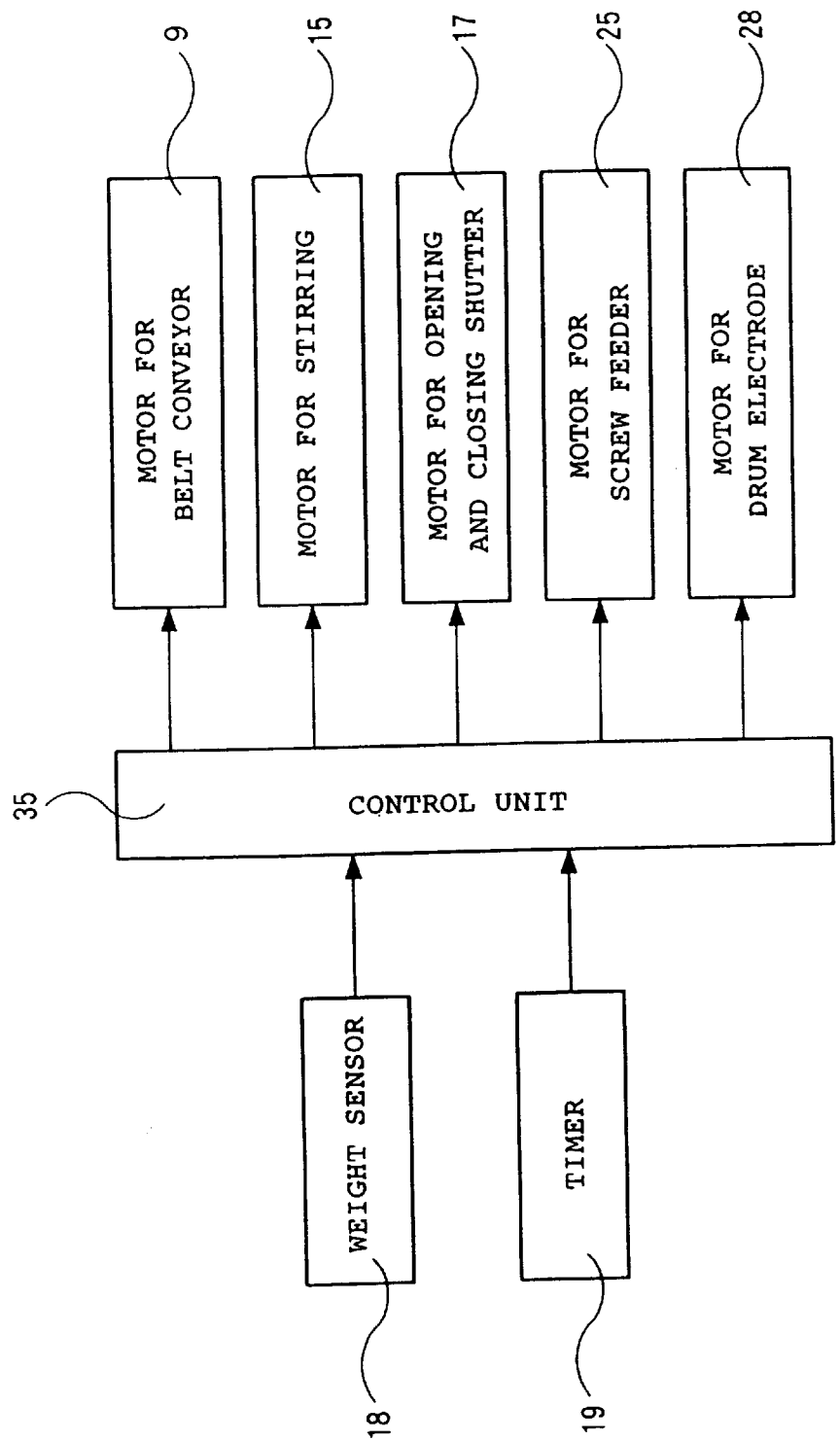
FIG. 3 is a block diagram of a control system in the plastics sorting apparatus.

As shown in FIGS. 1 to 3, numeral 1 denotes a plastics sorting apparatus for sorting fragmented plastic chips 2 containing a plurality of different plastic types. This plastics sorting apparatus 1 includes a charging device 4 and an electrostatic sorting device 7.

The charging device 4 charges batches of a predetermined amount of the plastic chips 2 that have been fed by a conveyor belt 3 (example of a first feeding device) while stirring these plastic chips 2. The electrostatic sorting device 7 then sorts the plastic chips 2, which have been charged with the charging device 4, by passing them between a drum electrode 5 (example of a movable electrode) and an electrode plate 6 (example of a stationary electrode).

The belt conveyor 3, which is driven by a motor 9 (example of a driving device), feeds the plastic chips 2 in batches of W1 [g] into the charging device 4.

The charging device 4 includes a container 13 having an insertion port 11 at the top and an ejection port 12 (example of an ejection portion) at the bottom, a stirring rod 14 (example of a stirring member) for stirring the plastic chips 2 that have been fed into the container 13 while rotating them, a motor 15 (example of a driving device) for rotating the stirring rod 14, a shutter 16 for opening and closing the ejection port 12, and a motor 17 for moving the shutter 16 so as to open and close the ejection port 12. The charging device 4 performs batch processing, which means that after the charging device 4 has stirred the plastic chips 2 that have been inserted into the container 13 for the time T [sec] that is necessary for the charging, the shutter 16 opens and a batch of plastic chips 2 is ejected from the ejection port 12.

The shutter 16 is provided with a weight sensor 18 (example of a feed weight detector) for detecting the weight of plastic chips 2 that have been fed into the container 13. Furthermore, the certain period of time T is measured by a timer 19. The inner volume Va [cm$^3$] of the container 13 is set to Va≧W1/D where D [g/cm$^3$] is the bulk density of the plastic chips 2.

A screw feeder 20 (example of a second feeding device) is provided between the charging device 4 and the electrostatic sorting device 7. This screw feeder 20 continuously feeds a feeding amount per unit time W2 [g/sec] of plastic chips 2 that have been ejected in batches from the ejection port 12 of the charging device 4 on to the peripheral surface of the drum electrode of the electrostatic sorting device 7.

The screw feeder 20 includes a container 23 having an insertion port 21 at the top on one side and an ejection port 22 at the bottom on the other side, two spiral-shaped screws 24 for transporting the plastic chips 2 that have been fed into the container 23 from the insertion port 21 to the ejection port 22 while rotating them, and a motor 25 (example of a driving means) for rotating the screws 24. The two screws 24 are arranged in parallel inside the container 23.

A funnel-shaped buffer 26, whose lower aperture becomes gradually narrower than its upper aperture, is arranged between the ejection port 12 of the charging device 4 and the insertion port 21 of the screw feeder 20. The inner volume Va of this buffer 26 is chosen to be at least the inner volume of the container 13 of the charging device 4.

The drum electrode 5 is a cylindrical member made of metal, which is rotated by a motor 28 (example of a driving device) at a peripheral speed v [cm/sec] in a constant direction around its horizontal axis. The drum electrode 5 has the width B [cm] in the direction of the horizontal axis, as shown in FIG. 2. The electrode plate 6 is fastened at a certain interval in opposition to the peripheral surface of the drum electrode 5. A high-voltage dc power source 29 applies a high voltage between the drum electrode 5 and the electrode plate 6. The cathode of the high-voltage dc power source 29 is connected to a current-supply brush 30 wiping along the peripheral surface of the drum electrode 5. The cathode of the high-voltage dc power source 29 is connected to the electrode plate 6. Thus, the drum electrode 5 is charged positively, whereas the electrode plate 6 is charged negatively.

Below the drum electrode 5, a first collecting container 31 and a second collecting container 32 are arranged for collecting the different types of plastic chips 2, which have been sorted by passing between the drum electrode 5 and the electrode plate 6. Moreover, a scraper 33 for scraping off plastic chips 2 that adhere to the peripheral surface of the drum electrode 5 is arranged at the periphery of the drum electrode 5.

The feeding amount per unit time W2 [g/sec] that is fed by the screw feeder 20 is adjusted so as to satisfy $$W1/T \leq W2 \leq v \times B \times H \times D \qquad (1)$$

where H [cm] is the average thickness of the layer of plastic chips 2 that is fed from the screw feeder 20 to the peripheral surface of the drum electrode 5.

As shown in FIG. 3, the plastics sorting apparatus 1 is also provided with a control device 35 for controlling the motors 9, 15, 17, 25 and 28 such that Equation (1) is satisfied, in accordance with the weight of plastic chips 2 that is detected by the weight sensor 18 and the time that is measured by the timer 19.

The following is an explanation of the operation of this configuration.

First of all, the belt conveyor 3, which is driven by the motor 9, feeds a feeding amount W1 of different types of fragmented plastic chips 2 in batches through the insertion port 11 of the charging device 4 into the container 13.

Then, the weight sensor 18 detects the weight of the feeding amount W1 of plastic chips 2 that have been fed into the container 13, and the plastic chips 2 are stirred by rotating the stirring rod 14 with the motor 15. The stirring is performed for a certain period of time T that is taken with the timer 19, and causes the different kinds of plastic chips 2 to rub against one another, whereby the plastic chips 2 are charged.

After the certain period of time T has elapsed, the rotation of the stirring rod 14 is halted, the motor 17 opens the shutter 16, as indicated by the dash-dotted line in FIG. 1, there by opening the ejection port 12 of the charging device 4, and a batch of plastic chips 2 is ejected from the ejection port 12, passes the buffer 26, and is inserted through the insertion port 21 of the screw feeder 20 into the container 23.

Thus, the plastic chips 2 that have been inserted into the screw feeder 20 are transported by the two screws 24, which are rotated by the motor 25, from the insertion port 21 through the container 23 towards the ejection port 22, and the feeding amount per unit time W2 is fed continuously from the ejection port 22 to the peripheral surface of the drum electrode 5.

Because the drum electrode 5 rotates at the peripheral speed v, the plastic chips 2 pass between the drum electrode 5 and the electrode plate 6. At this moment, plastic chips 2 that have been charged positively are repelled by the drum electrode 5 and attracted by the electrode plate 6 and fall into the first collecting container 31. On the other hand, plastic chips 2 that have been charged negatively are attracted by the drum electrode 5 and fall into the second collecting container 32. Thus, the plastic chips 2 are sorted.

In this process for sorting the plastic chips 2, by satisfying W1/T≦W2 , after a batch of plastic chips 2 has been fed by the screw feeder 20 from the charging device 4 to the drum electrode 5, the next batch of plastic chips 2 is ejected from the charging device 4 and fed by the screw feeder 20 to the drum electrode 5. Thus, it can be avoided that while first plastic chips 2 that have been ejected from the charging device 4 are being fed to the drum electrode 5 with the screw feeder 20, successive plastic chips 2 that are ejected later and inserted into the screw feeder 20, are added to the first plastic chips 2 that are still in the screw feeder 20. Consequently, the problem can be avoided that plastic chips 2 pile up between the charging device 4 and the screw feeder 20.

Moreover, by satisfying W2≦v×B×H×D, the feeding amount per unit time W2 of plastic chips 2 can be set optimally for electrostatic sorting, and the plastic chips 2 that have been fed to the drum electrode 5 form a layer on the peripheral surface of the drum electrode 5 that is thin enough for electrostatic sorting. Thus, it can be prevented that the plastic chips 2 accumulate to a form a layer that is thicker than is appropriate for electrostatic sorting, so that the plastic chips 2 can be reliably electrostatically sorted.

The control device 35 controls the motors 9, 15, 17, 25 and 28 so as to satisfy Equation (1). For example, when the feeding amount W1 of plastic chips 2 fed in batches from the belt conveyor 3 to the charging device 4 is increased to sort large amounts of plastic chips 2, the weight of the plastic chips 2 that is detected by the weight sensor 18 increases as well, so that the control device 35 increases the rotation speeds of the motors 25 and 28 in accordance with the detected weight. This increases the rotation speed of the screws 24 of the screw feeder 20, so that the feeding amount per unit time W2 from the screw feeder 20 to the drum electrode 5 increases, the peripheral speed v of the drum electrode 5 increases, and the Equation (1) is satisfied. Conversely, when the feeding amount W1 is decreased, the opposite control is performed.

Figure 4:
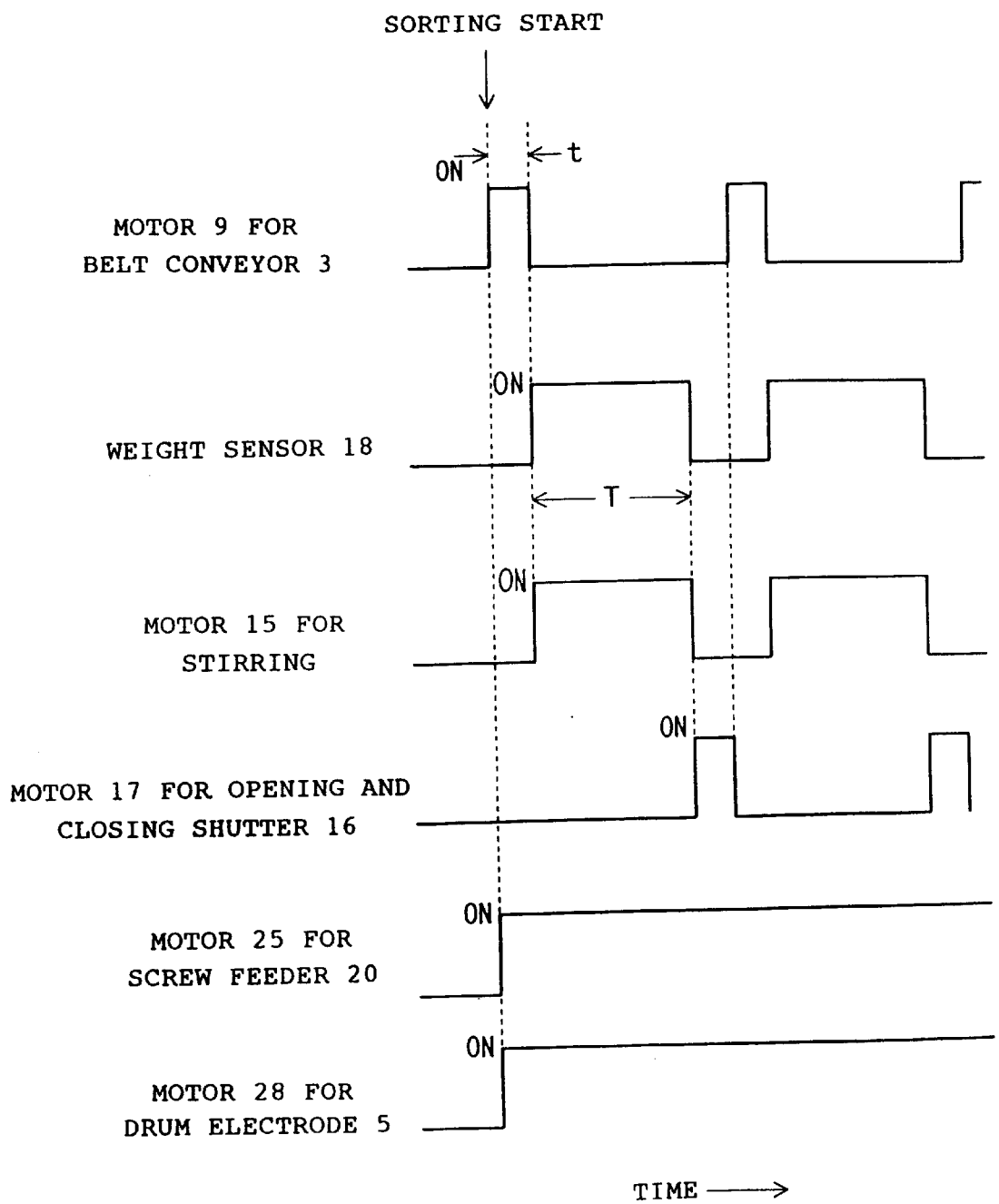
FIG. 4 is a time chart illustrating how the plastics sorting apparatus is controlled.
Figure 5:
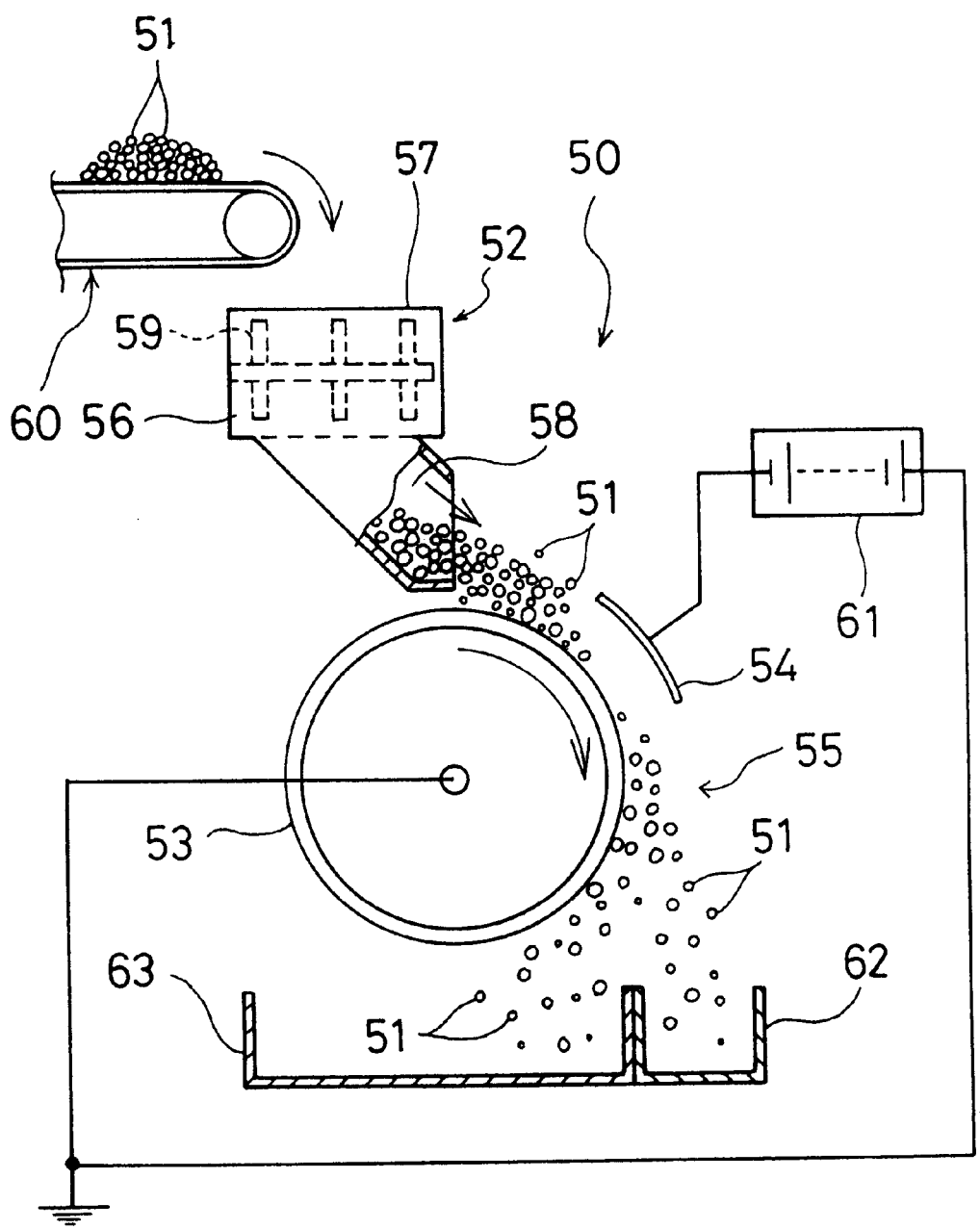
FIG. 5 is a diagram showing a configuration of a conventional plastics sorting apparatus.

FIG. 4 is a time chart showing the control during this sorting process. When the sorting starts, the motor 9 is turned on and drives the belt conveyor 3 for a certain period of time t, whereby a batch of plastic chips 2 is inserted into the container 13 of the charging device 4. Then, the weight sensor 18 and the motor 15 are turned on, rotating the stirring rod 14. Then, after a predetermined time T has elapsed, the motor 15 is turned off, the stirring rod 14 is halted, whereas the motor 17 is turned on to open the shutter 16 for a certain period of time. This ejects a batch of plastic chips 2 from the charging device 4, thereby turning the weight sensor 18 off. The motor 25 of the screw feeder 20 and the motor 28 of the electrostatic sorting device 7 are both turned on at the beginning of the sorting process, when the motor 9 of the belt conveyor 3 is turned on, and the screw 24 and the drum electrode 5 rotate continuously until the sorting is finished.

The following illustrates an example using the numerical values listed below for Equation (1):

Bulk density D of the plastic chips 2; D=0.4 g/cm³

Diameter Φ of the drum electrode 5; Φ=50 cm

Width B of the drum electrode 5; B=100 cm

Rotation speed of the drum electrode 5 per minute;=20 rpm

Average thickness H of layer of plastic chips 2; H=0.05 cm

Period of time T necessary for charging the plastic chips 2; T=30 sec

Feeding amount W1 of plastic chips 2 fed by the conveyor belt 3; W1=7.5liter=7.5×10³×0.4 g=3×10³ g Feeding amount per unit time W2 of plastic chips 2 fed by the screw feeder 20; W2=100g/sec Here, the peripheral speed v of the drum electrode 5 is v=50 cm×π×20 rpm/60=52.3 cm/sec Insertion of these values into Equation (1) yields;

3×10³ g/30 sec≦100 g/sec≦52.3 cm/sec×100 cm×0.05 cm ×0.4 g/cm³

Thus, W2 satisfies Equation (1):

$$W1/T\ (=100) \leq W2\ (=100) \leq v \times B \times H \times D\ (=104.6)$$

In the above-described embodiment, the ejection port 12 of the charging device 4 is opened with the shutter 16. Therefore, while the plastic chips 2 are stirred inside the charging device 4, insufficiently charged plastic chips 2 can be prevented from being ejected inadvertently through the ejection port 12 by keeping the ejection port 12 closed with the shutter 16. Then, after the plastic chips 2 have been stirred for a certain period of time T, the shutter 16 opens the ejection port 12, ejecting a batch of sufficiently charged plastic chips 2 through the ejection port 12.

In the above-described embodiment, plastic chips 2 that adhere to the peripheral surface of the drum electrode 5 and have not fallen down are scraped off with the scraper 33, and collected in the second collecting container 32.

In the above-described embodiment, a belt conveyor 3 is used as an example of a first feeding device. However, it is also possible to use transport dollies or the like to transport the plastic chips 2 to a position above the insertion port 11 of the charging device 4, and then drop the plastic chips 2 into the insertion port 11.

In the above-described embodiment, a biaxial screw feeder 20 having two parallel screws 24 is used as an example of a second feeding device. However, it is also possible to provide only one or three or more screws 24, depending on the width B of the drum electrode 5. Moreover, instead of a screw feeder 20, it is also possible to use a belt conveyor or a rotary valve to feed the plastic chips 2 in desired quantities.

In the above-described embodiment, the drum electrode 5 is charged positively, whereas the electrode plate 6 is charged negatively, but it is also possible to use reverse polarities for the charging.

In the above-described embodiment, a rotatable stirring rod 14 is provided inside the container 13 of the charging device 4 as an example of a stirring member. However, the present invention is not limited to rod shapes, and wing shapes can be used as well. In addition, it is also possible to stir the plastic chips 2 by rotating the container 13 with a motor.

In the above-described embodiment, the plastic chips 2 are charged by stirring them by rotating the stirring rod 14 for a predetermined time T. However, it is also possible to charge the plastic chips 2 by irradiation with ions for a predetermined time T.

INDUSTRIAL APPLICABILITY

The plastics sorting apparatus in accordance with the present invention as described above is suitable for sorting plastic chips by type, that have been obtained by fragmenting disposed plastic articles.

What is claimed is:

1. A plastics sorting apparatus comprising:

a charging device for charging a batch of a predetermined amount of different types of fragmented plastic chips while stirring the plastic chips; and an electrostatic sorting device for sorting plastic chips that have been charged with the charging device by passing them between a pair of sorting electrodes, characterized in that:

the charging device ejects a batch of plastic chips after stirring the plastic chips for a certain period of time T that is necessary to charge the plastic chips;

one of the pair of sorting electrodes is a stationary electrode, and the other of the pair of sorting electrodes is a movable electrode that is arranged to oppose the stationary electrode and adapted to rotate at a peripheral speed v;

the apparatus further comprises a first feeding device for feeding batches of a feeding amount W1 of the plastic chips to the charging device, and a second feeding device for continuously feeding onto the movable electrode of the electrostatic sorting device a feeding amount per unit time W2 of the plastic chips that have been ejected in batches from the charging device; and the feeding amount per unit time W2 is set to satisfy $$W1/T \leq W2 \leq v \times B \times H \times D$$

where B is a width of the movable electrode, H is an average thickness of the plastic chips that have been fed onto the movable electrode, and D is a bulk density of the plastic chips.

2. The plastics sorting apparatus as set forth in claim 1, wherein the charging device comprises a rotatable stirring member for stirring the plastic chips, and a feeding amount detector for detecting a feeding amount of the plastic chips that have been fed in batches from the first feeding device; wherein the first feeding device is a conveyor and the second feeding device is a screw feeder; and wherein the plastics sorting apparatus further comprises a control unit for controlling driving devices for driving the conveyor, the stirring member, the screw feeder and the movable electrode depending on the feeding amount that is detected by the feeding amount detector.

3. The plastics sorting apparatus as set forth in claim 1, further comprising a shutter for opening and closing an ejection portion of the charging device.

4. The plastics sorting apparatus as set forth in claim 2, further comprising a shutter for opening and closing an ejection portion of the charging device.

* * * * *